US012621758B2

(12) United States Patent (10) Patent No.: US 12,621,758 B2

Kang et al. (45) Date of Patent: May 5, 2026

(54) MULTI-LINK SPATIAL MULTIPLEXING SIGNALING WITH POWER SAVING

(71) Applicant: MEDIATEK INC., Hsin-Chu (TW)

(72) Inventors: Hao-Hua Kang, Hsinchu (TW);
Cheng-Ying Wu, Hsinchu (TW);
Chien-Fang Hsu, Hsinchu (TW);
Chih-Chun Kuo, Hsinchu (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/499,205

(22) Filed: Oct. 31, 2023

(65) Prior Publication Data

US 2024/0163785 A1 May 16, 2024

Related U.S. Application Data

(60) Provisional application No. 63/383,713, filed on Nov. 15, 2022.

(51) Int. Cl.
*H04W 48/18* (2009.01)
*H04W 74/0816* (2024.01)
*H04W 76/10* (2018.01)
(52) U.S. Cl.
CPC ....... *H04W 48/18* (2013.01); *H04W 74/0816* (2013.01); *H04W 76/10* (2018.02)
(58) Field of Classification Search
CPC .. H04W 48/18; H04W 76/10; H04W 74/0816
See application file for complete search history.

(56) References Cited

U.S. PATENT DOCUMENTS

| | | | |
|---|---|---|---|
| 2021/0378039 A1 | 12/2021 | Cherian | |
| 2023/0102066 A1* | 3/2023 | Ikeda | H04W 76/15 |
| | | | 455/461 |
| 2023/0164634 A1* | 5/2023 | Jang | H04W 28/20 |
| | | | 370/329 |
| 2025/0365779 A1* | 11/2025 | Lorgeoux | H04W 74/085 |

OTHER PUBLICATIONS

Duncan Ho, Clarifications for eMLSR, IEEE 802.11-20/1889R0, Nov. 2020, p. 1-6, CA, XP068175262, Nov. 2020.

* cited by examiner

*Primary Examiner* — Won Tae C Kim
(74) *Attorney, Agent, or Firm* — Winston Hsu

(57) ABSTRACT

A method for performing wireless communication in MLO architecture is applicable to an AP MLD connected with a non-AP MLD through multiple links. The multiple links include at least a first link and a second link, the non-AP MLD operates in ML-SMPS mode. The method includes transmitting an initial control frame to the non-AP MLD via the first link, to trigger at least one link of the multiple links to be activated at the non-AP MLD to support a reception with respective negotiated number of spatial streams, receiving a response frame via the first link in response to the transmission of the initial control frame, and initiating frame exchange between the AP MLD and the non-AP MLD via a target link of the at least one link. The target link is selected from the at least one link according to the response frame. The first link is a primary link.

20 Claims, 11 Drawing Sheets

200B

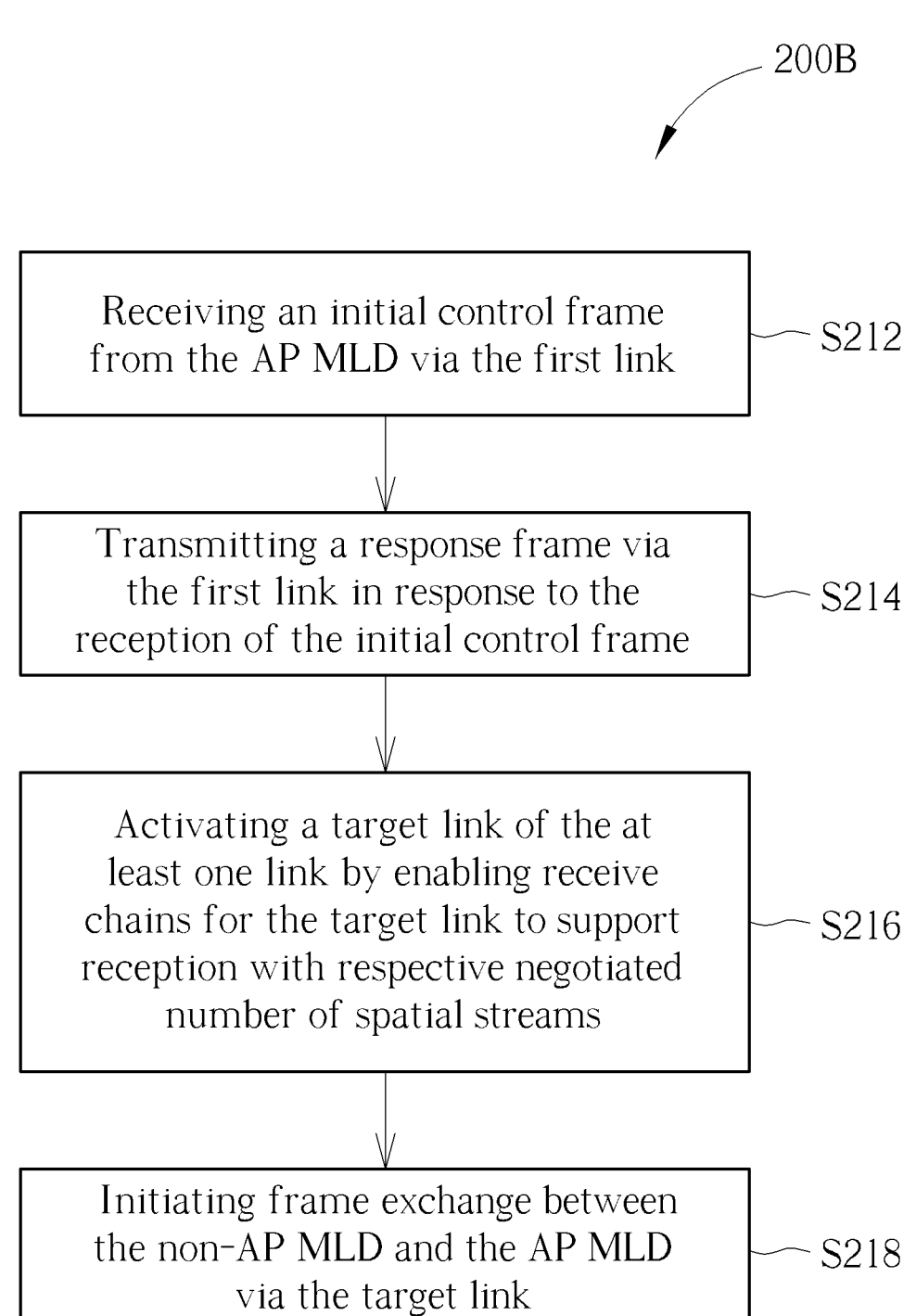

Receiving an initial control frame from the AP MLD via the first link — S212

Transmitting a response frame via the first link in response to the reception of the initial control frame — S214

Activating a target link of the at least one link by enabling receive chains for the target link to support reception with respective negotiated number of spatial streams — S216

Initiating frame exchange between the non-AP MLD and the AP MLD via the target link — S218

FIG. 2B

MULTI-LINK SPATIAL MULTIPLEXING SIGNALING WITH POWER SAVING

CROSS REFERENCE TO RELATED APPLICATIONS

This application claims the benefit of U.S. Provisional Application No. 63/383,713, filed on Nov. 15, 2022. The content of the application is incorporated herein by reference.

BACKGROUND

Wireless-Fidelity (Wi-Fi) is among the greatest successes of this new technology era. Wi-Fi has created new technologies, industries and careers around the globe. Since Wi-Fi has become an essential part of everyday life, its economic value is expecting to increase, as more capable Wi-Fi 6 based on the most recent Institute of Electric and Electronic Engineers (IEEE) 802.11ax specification becomes widely available. However, the demand for wireless data services continues to increase in many scenarios beyond the capabilities of Wi-Fi 6.

To address such demand, the IEEE 802.11 Working Group, which is responsible for developing standards and recommended practices of 802.11 architecture, has already initiated the development on the next generation of Wi-Fi, referred to as IEEE 802.11be Extremely High Throughput (EHT). IEEE 802.11be EHT is being developed to meet the throughput demands by the upcoming applications.

The IEEE 802.11be EHT is currently being developed as the next generation Wi-Fi standard to achieve higher data rate, lower latency, and more reliable connection to enhance user experience. The final version of the IEEE 802.11be specification is expected to be published by late 2023, and ratified in 2024. Meanwhile, the Wi-Fi Alliance has initiated the related development toward Wi-Fi 7 certification based on the IEEE 802.11be draft specification.

The next generation Wi-Fi 7 includes a number of new features. These features include Multi-Link Operation (MLO), Directional Beamforming, and Orthogonal Frequency Division Multiple Access (OFDMA). The MLO allows devices to connect to multiple Wi-Fi bands simultaneously, which can improve performance in crowded areas. The Directional Beamforming allows routers to focus their signal on specific devices, which can improve performance and reduce interference. The OFDMA allows multiple devices to share the same Wi-Fi channel without interfering with each other.

The Multi-Link Operation (MLO) is a key feature of Wi-Fi 7. As the current access point (AP) and station (STA) have dual-band or tri-band transmission capabilities, the newly developed MLO feature enables packet-level link aggregation in the media access control (MAC) layer across different physical (PHY) links. By performing load balancing according to traffic requirements, MLO achieves significantly higher throughput and lower latency for enhanced reliability in a heavily loaded network. With MLO capability, a Multi-Link Device (MLD) comprised of multiple "affiliated" devices to the upper logical link control (LLC) layer, allowing concurrent data transmission and reception in multiple channels across a single or multiple frequency bands in 2.4 GHz, 5 GHz and 6 GHz. Thus, there is an opportunity to add or improve aspects of a wireless local area network (WLAN) as the communication protocols evolve.

SUMMARY

An embodiment provides a method for performing wireless communication in multi-link operation (MLO) architecture. The method is applicable to an access point (AP) multi-link device (MLD) connected with a non-AP MLD through multiple links comprising at least a first link and a second link. The non-AP MLD operates in Multi-link Spatial Multiplexing Power Save (ML-SMPS) mode. The method comprises transmitting an initial control frame to the non-AP MLD via the first link to trigger at least one link of the multiple links to be activated at the non-AP MLD to support a reception with respective negotiated number of spatial streams, receiving a response frame via the first link in response to the transmission of the initial control frame, and initiating frame exchange between the AP MLD and the non-AP MLD via a target link of the at least one link. The first link is a primary link. The target link is selected from the at least one link according to the response frame.

An embodiment provides a method for performing wireless communication in multi-link operation (MLO) architecture. The method is applicable to a non-access point (AP) multi-link device (MLD) connected with an AP MLD through multiple links comprising at least a first link and a second link. The non-AP MLD operates in Multi-link Spatial Multiplexing Power Save (ML-SMPS) mode. The method comprises receiving an initial control frame from the AP MLD via the first link. The initial control frame is used trigger at least one link of the multiple links to be activated at the non-AP MLD to support a reception with respective negotiated number of spatial streams. The method further comprises transmitting a response frame via the first link in response to the reception of the initial control frame, activating a target link of the at least one link by enabling receiving chains for the target link to support the reception with respective negotiated number of spatial streams, and initiating frame exchange between the non-AP MLD and the AP MLD via the target link in the at least one link. The first link is a primary link. The target link is selected from the at least one link according to the response frame An embodiment provides an access point (AP) multi-link device (MLD) comprising a first AP, a second AP and a processor coupled to the first AP and the second AP. The first AP and the second AP are used to establish multi-link connection between the AP MLD and a non-AP MLD. The multi-link connection comprises at least a first link between a first station (STA) of the non-AP MLD and a first AP of the AP MLD and a second link between a second STA of the non-AP MLD and a second AP of the AP MLD. The processor is used to transmit an initial control frame to the non-AP MLD via the first link, to trigger at least one link of the multiple links to be activated at the non-AP MLD to support a reception with respective negotiated number of spatial streams, receive a response frame via the first link in response to the transmission of the initial control frame, and initiate frame exchange between the AP MLD and the non-AP MLD via a target link of the at least one link. The first link is a primary link. The target link is selected from the at least one link according to the response frame.

An embodiment provides a non access point (non-AP) multi-link device (MLD) comprising a first station (STA), a second STA and a processor coupled to the first STA and the second STA. The first STA and a second STA are used to establish multi-link connection between an AP MLD and the non-AP MLD, the multi-link connection comprising at least a first link between a first STA of the non-AP MLD and a first AP of the AP MLD and a second link between a second STA of the non-AP MLD and a second AP of the AP MLD. The processor is used to receive an initial control frame from the AP MLD via the first link, transmit a response frame via the first link in response to the reception of the initial control frame, activate a target link of the at least one link by enabling receiving chains for the target link to support reception with respective negotiated number of spatial streams, and initiate frame exchange between the non-AP MLD and the AP MLD via the target link in the at least one link. The initial control frame is used to trigger at least one link of the multiple links to be activated at the non-AP MLD to support a reception with respective negotiated number of spatial streams. The first link is a primary link.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

FIG. 2B is a flowchart for method of wireless communication implemented by the non-AP MLD through the multi-link connection.

DETAILED DESCRIPTION

Figure 1:
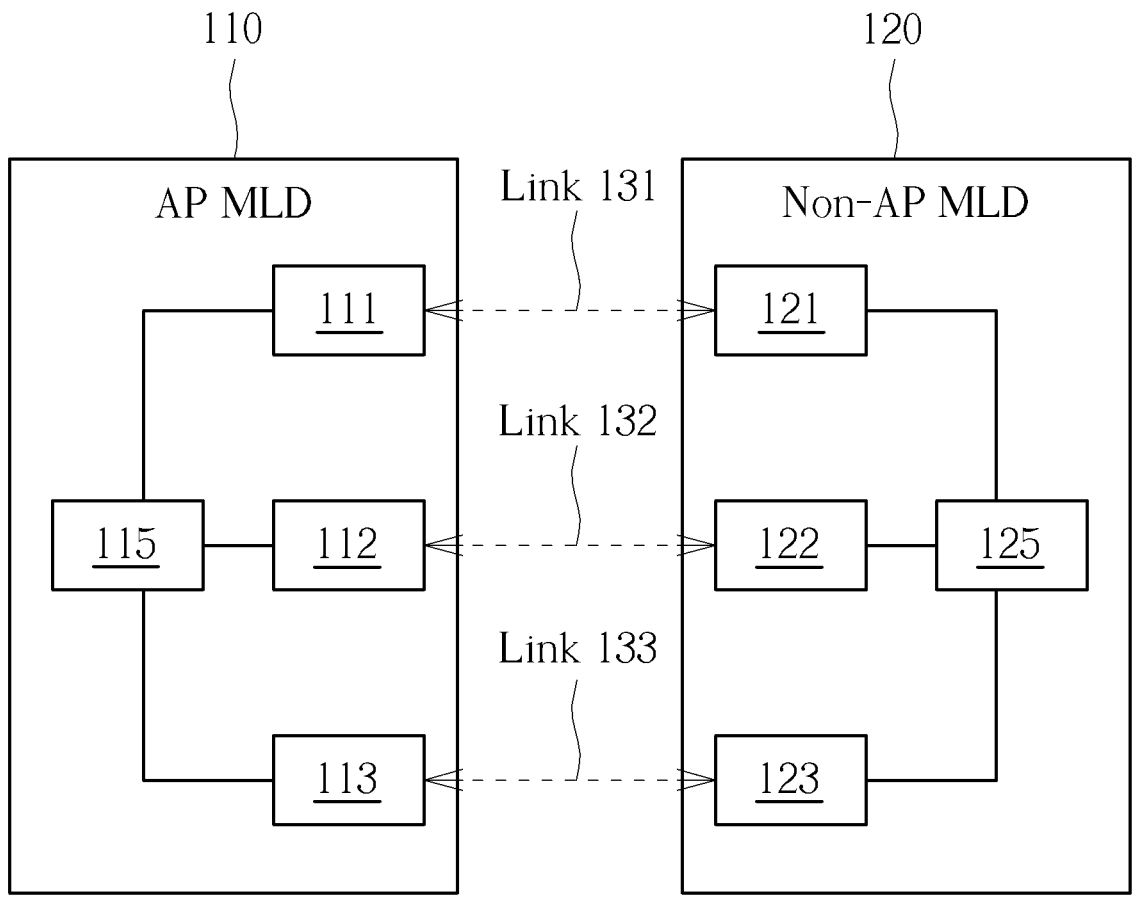
FIG. 1 is a diagram illustrating a multi-link operation system comprising an AP MLD and a non-AP MLD of an embodiment.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving RF signals according to one or more of the Institute of Electrical and Electronics Engineers (IEEE) 802.11 standards (e.g., 802.11be and future-developed standards.). The wireless local area network (WLAN) may operate in several different frequency bands of the RF spectrum. For example, the exemplary embodiments are described with reference to links operating in the 2.4 GHz, 5 GHz and 6 GHz frequency bands. However, other frequency bands may also be used, including, but not limited to, the 900 MHz, 3.6 GHz, 4.9 GHz, 5.9 GHz, 60 GHz bands, etc. Each band may include multiple channels. However, any reference to WLAN, a particular communication protocol or a particular frequency band is for illustrative purposes. The exemplary embodiments apply to any type of network that supports communication over multi-links between devices.

The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal frequency division multiple access (OFDMA), single-user (SU) multiple input multiple output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

A WLAN in a home, an apartment, a business, or other areas may include one or more WLAN devices that share a wireless communication medium. A station (STA) is a logical entity in a WLAN device and represents an addressable instance of a media access control (MAC) and physical layer (PHY) interface to the wireless communication medium. An access point (AP) is a WLAN device that includes a distribution system access function. The basic building block of a WLAN conforming to the IEEE 802.11 family of standards is a Basic Service Set (BSS), which is managed by an AP. Each BSS includes the AP and those STAs that are associated with the AP.

Some WLAN devices may operate multiple STA interfaces (hereinafter referred to as "STA"), such as a first STA and a second STA in the same device. Recently, the IEEE is discussing techniques for multi-link connection. A multi-link device (MLD) is a type of WLAN device that includes multiple interfaces and is capable of establishing a multi-link connection with another MLD. An AP MLD may operate multiple BSSs and supports a multi-link connection with a non-AP MLD. Other terms may be envisioned for the various types of MLDs. For example, an AP MLD also may be referred to as an AP entity or a multi-link access point (ML-AP). A non-AP MLD also may be referred to as non-AP entity, an STA MLD, or a multi-link station (ML-STA). For clarity, this disclosure refers to the multi-link capable devices as either an AP MLD or a non-AP MLD. In some implementations, an AP MLD may operate a first BSS in a first frequency band and a second BSS in a second frequency band. The AP MLD and a non-AP MLD may establish a multi-link connection in which multiple links are enabled between the AP MLD and the non-AP MLD. Each link of the multi-link connection may be between a different STA of a non-AP MLD in a corresponding BSS of the AP MLD. For example, a non-AP MLD may establish a first link to the first BSS using a first STA of the non-AP MLD and may establish a second link to the second BSS using a second STA of the non-AP MLD. The multiple links of the multi-link connection may be established using different channels, frequency bands, or spatial streams, among other examples.

A multi-link connection may streamline the establishment of multiple links. A multi-link connection may also be referred to as a multi-link setup. The multi-link setup via a first link may enable the multiple STAs of the non-AP MLD to concurrently associate with the different BSSs operated by the AP MLD. Thereafter, one link (which may be the first link or any of the other links established in the multi-link setup) may be maintained as an active connection for signaling or other basic BSS operations related to the multi-link connection. In some implementations, the link that is maintained for signaling or other basic BSS operations may be referred to as a primary link, master link, control link, or other terms to differentiate that link from other links of the multi-link connection. The other links of the multi-link connection may be referred to as non-primary links, secondary links, subordinate links, dynamic links, or other such terms.

Multi-link communication may enable a larger amount of data throughput between the MLDs because multiple links may concurrently transmit data when they are activated. Each link may be associated with a different RF chain of the MLD and each RF chain may consume power when it is activated for transmission/reception. Therefore, when less data is available, it may be desirable to deactivate/disable some non-primary links and/or some RF chains rather than activating/enabling all supported RF chains for respective link to reduce power consumption. Having the ability to dynamically activate or deactivate non-primary links may provide greater flexibility for power saving and throughput.

This disclosure provides systems, methods, and apparatus, including computer programs encoded on computer-readable media, for multi-link communication or operation. Various aspects relate generally to signaling to manage or control the activation or deactivation of at least one link of a multi-link connection. The signaling may enable the non-AP MLD to select which links to be activated for communication traffic between the AP MLD and the non-AP MLD. For example, the activation or deactivation of a non-primary link may be signaled by explicit messaging, broadcast messaging, or as part of a data packet on the primary link. The activation of a non-primary link may be based on the amount or type of data buffered to be sent from an AP MLD to a non-AP MLD, or vice versa. An AP MLD may use a primary link to aid the non-AP MLD with power saving capability, throughput, reliability, or data separation.

In accordance with this disclosure, signaling regarding multi-link connections may be sent or received on the primary link. In some implementations, an AP MLD may indicate that it supports a multi-link connection in the beacon frames or other discovery information that the AP MLD broadcasts so that the non-AP MLD can determine that the AP MLD supports multi-link connection. The AP affiliated with the AP MLD may periodically broadcast beacon frames including the BSSID to enable any STAs within wireless range of the AP to establish a respective communication link, or to maintain a communication link, with the AP.

A non-primary link may be "enabled" for communication on demand, for example, the non-AP MLD or the AP MLD may dynamically activate or deactivate the non-primary link, such as based on the traffic. Furthermore, one or more non-primary links may be dynamically activated or deactivated based on throughput requirements, speed, or quality of service. In one example, when the non-primary link is activated, it implies that the STA for that link may be in an awake state such that it is fully powered (for example, supporting a reception with negotiated number of spatial streams) and able to transmit or receive data. When the non-primary link is deactivated, the STA for that link may be in a doze state (mode) in which the STA consumes very low power and is unable to transmit or receive data on the deactivated link. Alternatively, when the non-primary link is deactivated, the STA for that link may be in an awaken state but not all RF chains are enabled, for example, only one RF chain for the deactivated link is enabled.

Some aspects more specifically relate to power saving techniques that involve activation or deactivation of non-primary links, alternatively, enable or disable other RF chains for primary link and/or non-primary link(s). The signaling described in this disclosure may be used to realize power savings in a non-AP MLD. In some implementations, the signaling may include timing information to coordinate the timing of communication via a non-primary link or the timing for activation of the non-primary link. In some implementations, an AP MLD may provide sufficient time for a non-AP MLD to enable RF chains for a non-primary link as part of the activation before transmitting data on the non-primary link. Referred to as a "warm up" time, there may be a delay associated with the enabling of the RF chains at the non-AP MLD. Signaling may ensure that sufficient warm up time is provided so that the non-AP MLD is ready to receive communication before the AP MLD sends communication on the non-primary link.

In the following disclosure, the term "activate" may refer to the enabling of a link (i.e., waking up the associated STA from doze mode), or upgrading transmission capability of a link from 1ss (spatial stream) to 2ss or higher by enabling more receiving chains. In summary, it is expected that the associated STAs are able to support the reception with respective negotiated number of spatial streams. The term "deactivate" may refer to returning to the state before activation. For example, if a link is disabled prior to activation (i.e., the associated STA before activation is doze mode), the link may remain disabled (i.e., the associated STA may return to the doze mode) after being deactivated. If the state of a link before activation is only one receiving chain being enabled, after being deactivated, the link may return to remain only one receiving chain enabled by disabling other receiving chains. It is noted that the wakeup of the associated STA means that the STA will enable some RF chains and be able to support the reception with negotiated number of spatial streams (SS or ss) for corresponding link.

In some implementations, a primary link may be set up on a lower frequency band for better coverage and reliability while a non-primary link may be set up on a higher frequency band so that the non-primary link can be activated for greater throughput when there is data to send. In some implementations, the non-primary link may be used as an on-demand dedicated data channel. And because signaling or management frames may be communicated via the primary link, there may be a greater efficiency of communication on the dedicated data channel. In some implementations, The AP MLD may indicate which link or links to be activated for the transmission of the traffic.

This disclosure includes a variety of techniques for signaling multi-link control information. For example, each of the links may be identified using explicit signaling or implicitly based on one or more of the structures of a control frame or a response frame, certain bit settings or bitmaps in frame field, or the link (such as the channel or band) at which the frame is exchanged. For example, the identifier of the link of interest may be determined from the initial control frame or the response frame that carries the identifiers. Some of the control frames (i.e., initial control frame and/or response frame) may include Power Save (PS)-Poll, Request to Send (RTS), Clear to Send (CTS), Acknowledgment (ACK), and Contention-Free (CF)-END frame. In addition, the initial control frame types may include Beamforming Report Poll (BFRP), Multi-User Block Acknowledgement Request (MU-BAR), Multi-user Request to Send (MU-RTS), Buffer Status Report Poll (BSRP), Bandwidth Query Report Poll (BQRP), and NDP Feedback Report Poll (NFRP) frame.

In some implementations, the non-AP MLD may enable or activate a non-primary link that was previously deactivated using signaling described herein. Furthermore, the activation of a non-primary link also may include activation of spatial multiplexing (SM) on the non-primary link. Multi-link SM power saving (referred to as "Multi-link SMPS" or "ML-SMPS") mode may be implemented for more than one link of a multi-link connection. ML-SMPS mode may refer to the use of multi-link spatial stream communication for basic signaling and lower power consumption. At times when more data is communicated, additional RF chains at the non-AP MLD may be activated to perform processing of different SM streams. In a multi-link connection, the signaling for activating or deactivating desired link during the non-AP MLD operating in the SMIPS mode may be transmitted on a primary link. When there is data to transmit or receive, a MLD may activate additional RF chains (for either or both the primary link and non-primary links) to take advantage of spatial multiplexing, that is, implementing multi-link spatial multiplexing (MLSM). When there is no data (or small amount of data) to transmit or receive, the MLD may deactivate some RF chains to conserve power.

Particular implementations of the subject matter described in this disclosure can be implemented to realize one or more of the following potential advantages. A wireless communication device may avoid having multiple RF chains activated until they are needed. By reducing the number of activated RF chains, power saving may be realized at the wireless communication device. The signaling may provide better time coordination for non-primary links based on warm up time used by a non-AP MLD to activate an RF chain for a non-primary link.

FIG. 1 is a diagram illustrating a multi-link operation system comprising an AP MLD 110 and a non-AP MLD 120 of an embodiment. The AP MLD 110 includes a first AP 111, a second AP 112 and optionally, a third AP 113, which are affiliated with the AP MLD 110. The AP MLD 110 also includes a processor 115 coupled to the first AP 111, the second AP 112 and optionally the third AP 113. The non-AP MLD 120 includes a first STA 121, a second STA 122 and optionally, a third STA 123. The non-AP MLD 120 also includes a processor 125 coupled to the first STA 121, the second STA 122 and, optionally, the third STA 123, which are affiliated with the non-AP MLD 120.

The multi-link connection is established between the AP MLD 110 and a non-AP MLD 120. The connected multiple links include a first link 131 (i.e., primary link) between the first STA 121 and the first AP 111, and a second link 132 (i.e., non-primary link) between a second STA 122 and the second AP 112. The multiple links may optionally include a third link 133 (i.e., non-primary link) between the third STA 123 and the third AP 113 accordingly. The multi-link operation implements spatial multiplexing on the multiple links.

The processor 115 of the AP MLD 110 and the processor 125 of the non-AP MLD 120 are used to process frames and packets during the multi-link operation. In particular, the processors 115 and 125 work in coordination to activate the second STA 122 and/or the third STA 123 by waking up the second STA 122 and/or the third STA 123 from the doze mode, exchange frames between the AP MLD 110 and the non-AP MLD 120 through the first link 131, the second link 132 and/or the third link 133, and deactivate the second STA 122 and/or the third STA 123 by causing the second STA 122 and/or the third STA 123 to enter the doze mode. Also, they may work together to negotiate for the number of spatial streams (ss) for each link (such as primary link or non-primary link), to be supported by both associated AP and STA corresponding to the respective link. Also, both the AP MLD 110 and the non-AP MLD 120 may have Simultaneous TX and RX (STR) N1×N2×N3 capabilities if three links are configured; the AP MLD 110 and the non-AP MLD 120 may have STR N1×N2 capabilities if two links are configured. N1, N2, N3 may represent a positive integer greater than or equal to 2 (e.g., 2, 3, 4 . . . 16, etc.) respectively. Further, N1, N2, N3 may represent the spatial stream capability negotiated for each individual link. For example, it may represent the maximum number of spatial streams supported by a single link, which is determined by the capabilities of the multi-link device. In some embodiments, the values of N1, N2, and N3 may be different or the same. For a purpose of illustration and understanding, the following examples are given with N1=N2=N3=2, but the present disclosure is not limited thereto.

The present disclosure describes a scheme to effectively control power consumption at a non-AP MLD in multi-link operation. During a non-AP MLD is in SIPS mode and the associated AP MLD wants to transmit frames to the non-AP MLD, the AP MLD first triggers the activation of the corresponding link at the non-AP MLD. Then, frames may be exchanged between the AP MLD and the non-AP MLD using negotiated number of spatial streams via the activated link. Additionally, when there is no more frame needing to transmit, the non-AP MLD may deactivate the corresponding link to return to the default state, to save power.

Figure 2A:
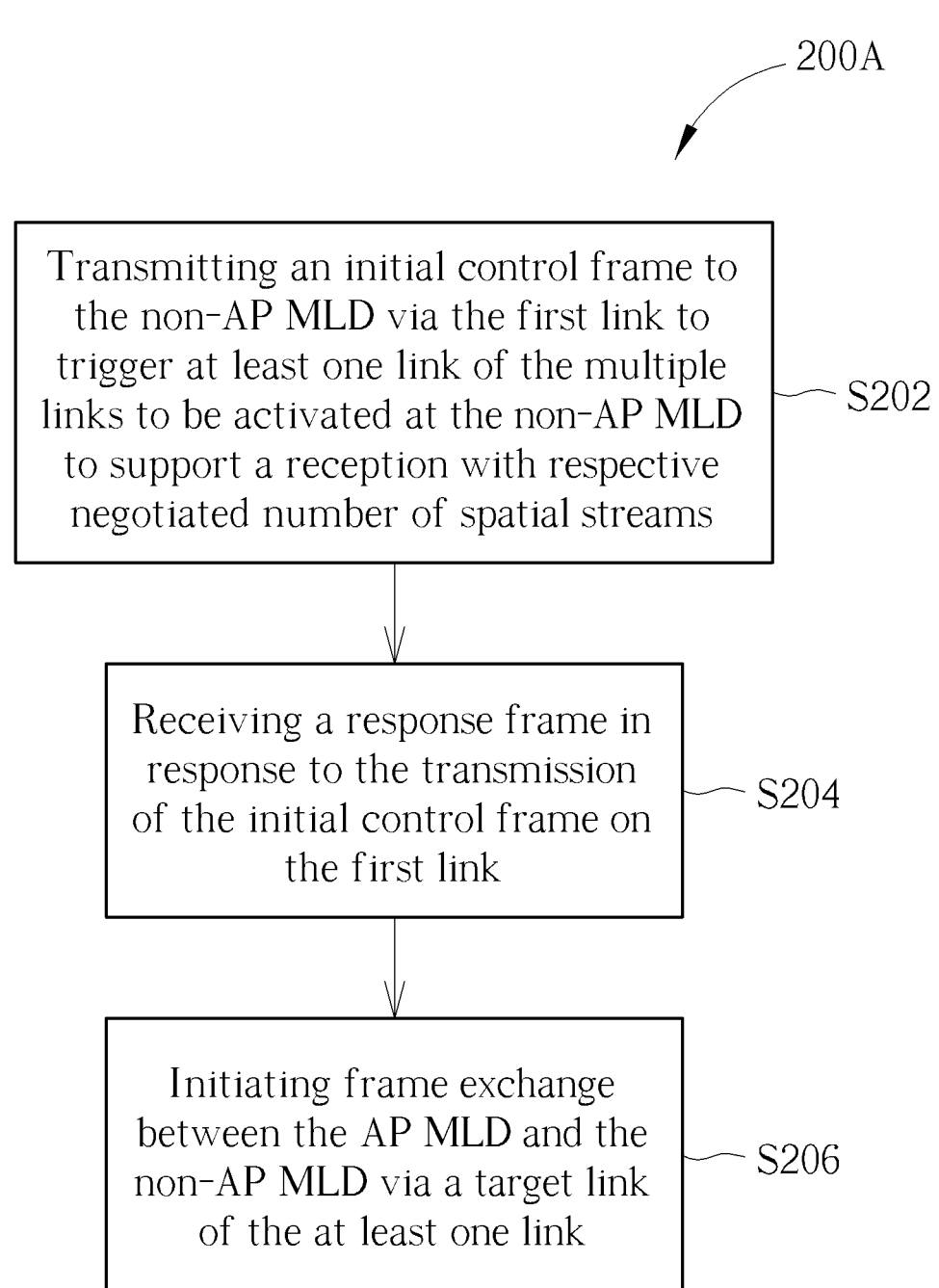
FIG. 2A is a flowchart for method of wireless communication implemented by the AP MLD through the multi-link connection.

FIG. 2A is a flowchart for method 200A of wireless communication implemented by the AP MLD 110 through the multi-link connections, wherein the AP MLD is connected with a non-AP MLD through multiple links comprising at least a first link and a second link, and the non-AP MLD is operated in Multi-link Spatial Multiplexing Power Save (ML-SMPS) mode. The method 200A may include the following steps:

S202: Transmitting an initial control frame to the non-AP MLD 120 via the first link to trigger at least one link of the multiple links to be activated at the non-AP MLD 120 to support a reception with respective negotiated number of spatial streams;

S204: Receiving a response frame via the first link in response to the transmission of the initial control frame; and S206: Initiating frame exchange between the AP MLD 110 and the non-AP MLD 120 via a target link of the at least one link.

In some embodiments, the first link is a primary link among the multiple links, for example, one receiving chain is enabled by default for the primary channel at the non-AP MLD 120 during the non-AP MLD 120 operating in the SMPS mode. In some embodiments, the multiple links may further comprise a third link, for example, the multiple links may comprise link 131, 132 and 133. Further, the at least one link may include the first link 131, the second link 132 and the third link 133 or any combination of these links.

In some embodiments, a bitmap or a field in the initial control frame may be used for indicating the at least one link of the multiple links to be activated at the non-AP MLD. In one example, the response frame may carry information for indicating which link of the at least one link to be accepted or rejected at the non-AP MLD, and the target link comprises an accepted link. Alternatively, the response frame does not carry information for indicating whether to accept or reject any link in the at least one link, and the target link comprises all of the at least one link or the pre-negotiated link(s) which may be pre-negotiated between the non-AP MLD and AP MLD during enabling the ML-SMPS mode. It is noted that the target link may be at least part or all of the at least one link and is at least related to the response frame. That is to say, the target link is selected from the at least one link according to the response frame.

FIG. 2B is a flowchart for method 200B of wireless communication implemented by the non-AP MLD 120 through the multi-link connection, wherein the non-AP MLD is operated in SMPS mode and connected with an AP MLD through multiple links which may comprise at least a first link and a second link. The method 200B may include the following steps:

S212: Receiving an initial control frame from the AP MLD 110 via the first link;

S214: Transmitting a response frame via the first link in response to the reception of the initial control frame;

S216: Activating a target link of the at least one link by enabling receiving chains for the target link to support reception with respective negotiated number of spatial streams; and S218: Initiating frame exchange between the non-AP MLD 110 and the AP MLD 120 via the target link.

In some embodiments, the initial control frame is used to trigger at least one link of the multiple links to be activated at the non-AP MLD 120 to support a reception with respective negotiated number of spatial streams. The first link is a primary link. For example, one receiving chain is enabled by default for the primary link at the non-AP MLD 120. That is to say, before activating the primary link to support reception with a negotiated number of spatial streams for the primary link, one receiving chain is enabled for the primary link by default at the non-AP MLD 120. In some embodiments, the multiple links may further comprise a third link, for example, the multiple links may comprise link 131, 132 and 133. Further, the at least one link may include the first links 131, the second link 132 and the third link 133 or any combination of these links.

In one example, during the non-AP MLD operating in the SIPS mode, one receiving chain may be enabled for the first link (a primary link) and other links are disabled (for example, the STAs associated with the other links are in doze mode) by default at the non-AP MLD. For illustrative purposes, more details are described under this scenario, but the invention is not limited to thereto. For example, in another example, during the non-AP MLD operating in the SMPS mode, one receiving chain for any combinations of other links may also be enabled, and the invention is applicable to these exemplary scenarios as well.

Figure 3:
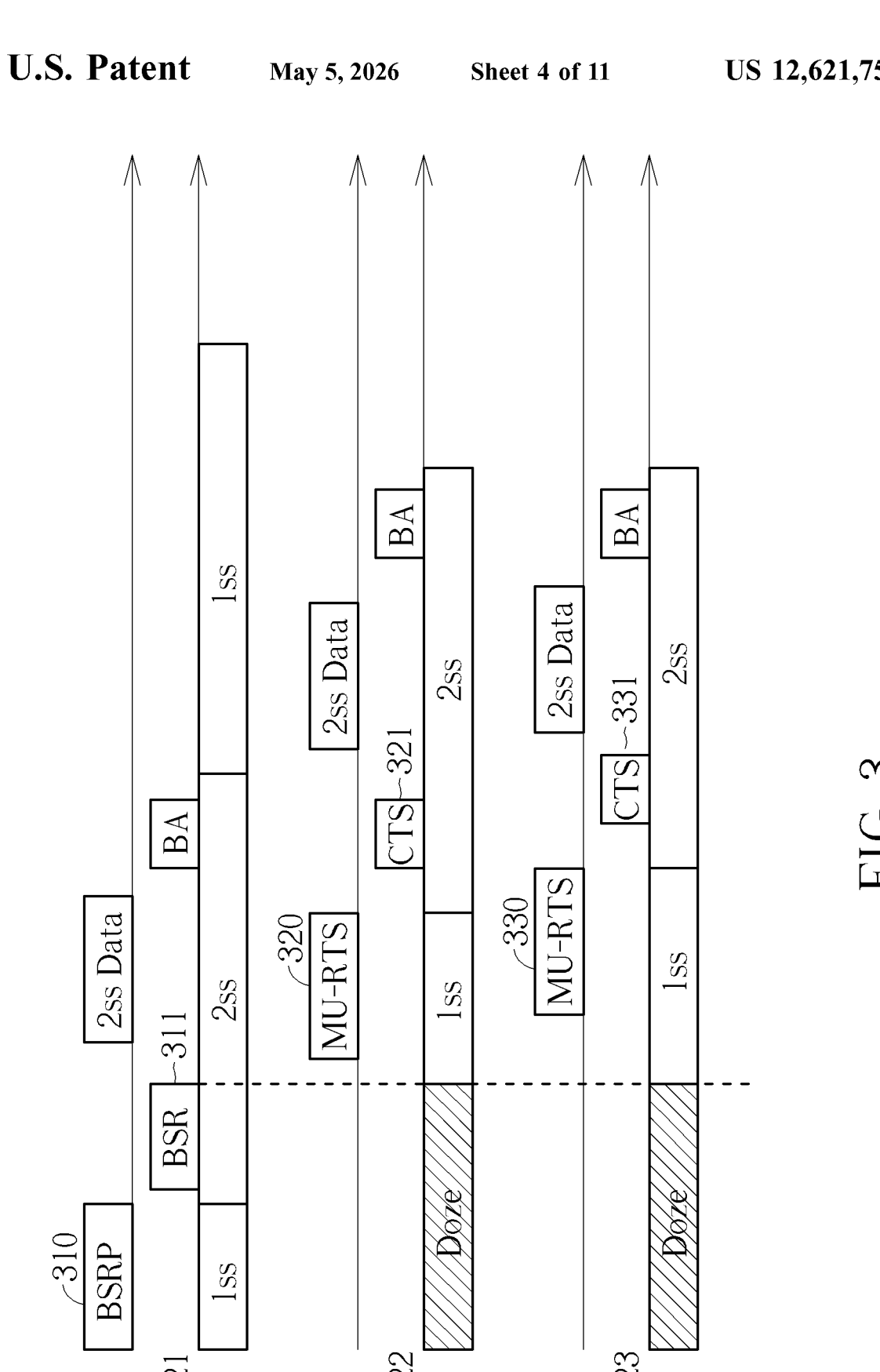
FIG. 3 is a diagram illustrating an exemplary signaling process to activate one or more links of the multi-link connection of an embodiment.

FIG. 3 is a diagram illustrating an exemplary signaling process to activate one or more links of the multi-link connection of an embodiment. The AP MLD 110 and the non-AP MLD 120 has established a multi-link connection that includes configuration for a first link 131 (i.e., primary link), the second link 132 and the third link 133 (i.e., non-primary links). For illustration purpose, this disclosure adopts three links as an example, but the present invention is not limited thereto. The example can also be described with two or other number of links.

Initially, the first AP 111 affiliated with the AP MLD 110 may transmit to the first STA 121 affiliated with the non-AP MLD 120 via the first link 131 an initial control frame 310 (e.g., Buffer Status Report Poll (BSRP) frame) with a bitmap or a field for triggering the activation of the links 131, 132 and 133. After receiving the initial control frame 310, the first STA 121 affiliated with the non-AP MLD 120 may respond via the first link 131 with a response frame 311 (e.g., Buffer Status Report (BSR) frame) to accept the bitmap to activate links 131, 132 and 133. After the first STA 121 transmits the response frame 311, the second STA 122 and the third STA 123 can wake up from doze mode immediately. Alternatively, the second STA 122 and the third STA 123 may wake up from doze mode or activate the second link 132 immediately after receiving the initial control frame 310. In one example, they enable one receiving chain respectively after waking up as shown in FIG. 3, but the present invention is not limited to this. For example, in another example, each or both of the second STA 122 and the third STA 123 can wake up from doze mode and enable N receiving chains, wherein N represents the spatial stream capability negotiated for respective link as described previously, for example, taking N=2 for an illustrative example. Then, after the first AP 111 receives the response frame 311, the second AP 112 may transmit to the second STA 122 via the second link 132 a control frame 320 (e.g., Multi-User Request to Send (MU-RTS) frame) for contending channel on the respective link to initiate frame exchange. When the second STA 122 receives the control frame 320, the second STA 122 may respond via the second link 132 with a response frame 321 (e.g., Clear to Send (CTS) frame) indicating that the second STA 122 is ready to receive.

It should be noted that the non-AP MLD 120 may be in spatial multiplexing power saving (SMIPS) mode. In the example shown FIG. 3, one receiving chain of one link (e.g., link 131 as a primary link) is enabled and the other links are disabled. When the AP MLD 110 expects to transmit data or update information to the non-AP MLD 120, the AP MLD 110 may activate at least one link (e.g., links 131, 132 and 133) to trigger the non-AP MLD 120, to support reception with a negotiated number of spatial streams via the activated link.

After the first STA 121 receives the initial control frame 310 (alternatively, after the first STA 121 responds with the response frame 311), the first link 131 may upgrade from one spatial stream (ss) to two spatial streams by enabling additional receiving chain for the first STA 121. Then, the first AP 111 may transmit 2ss data frames (referred to "2ss Data" in FIG. 3) and the first STA 121 may respond with Block Acknowledgement (BA) frames. Furthermore, after the second STA 122 receives the MU-RTS frame 320, the second link 132 may upgrade from 1ss to 2ss. Alternatively, the second link 132 may upgrade from 1ss to 2ss after responding with the response frame 321. Then, the second AP 112 may transmit 2ss data frames and the second STA 122 is capable of receiving the 2ss data frames because it has enabled two receiving chains, allowing for the reception of frames using two spatial streams, and then the second STA 122 may respond with BA frames.

The activation of the third link 133 may follow the same pattern as described above. After the first AP 111 receives the response frame 311, the third AP 113 may transmit to the third STA 123 via the third link 133 a control frame 330 (e.g., MU-RTS frame). When the third STA 123 receives the control frame 330, the third STA 123 may respond via the third link 133 with a response frame 331 (e.g., CTS frame).

Furthermore, after the third STA 123 receives the control frame 330 or after the third STA 123 responds with the response frame 331, the third link 133 may upgrade from 1ss to 2ss. Then, the third AP 113 may transmit 2ss data frames which can be received by the third STA 123 via the third link 133 and the third STA 123 may respond with BA frames.

It should be noted that the AP MLD 110 and the non-AP MLD 120 may negotiate which link or links to be activated at the non-AP MLD to support a reception with respective maximum number of spatial streams through the first AP 111 transmits the initial control frame 310 and the first STA 121 responds with the response frame 311 via the first link 131 (i.e., primary link). Also, the bitmap may indicate the same or different links each time.

In some embodiments, the initial control frame may be a BSRP frame and the response frame may be a BSR frame. In some embodiments, the initial control frame may be a MU-RTS frame and the response frame may be a CTS frame. However, the invention is not limited thereto.

Figure 4:
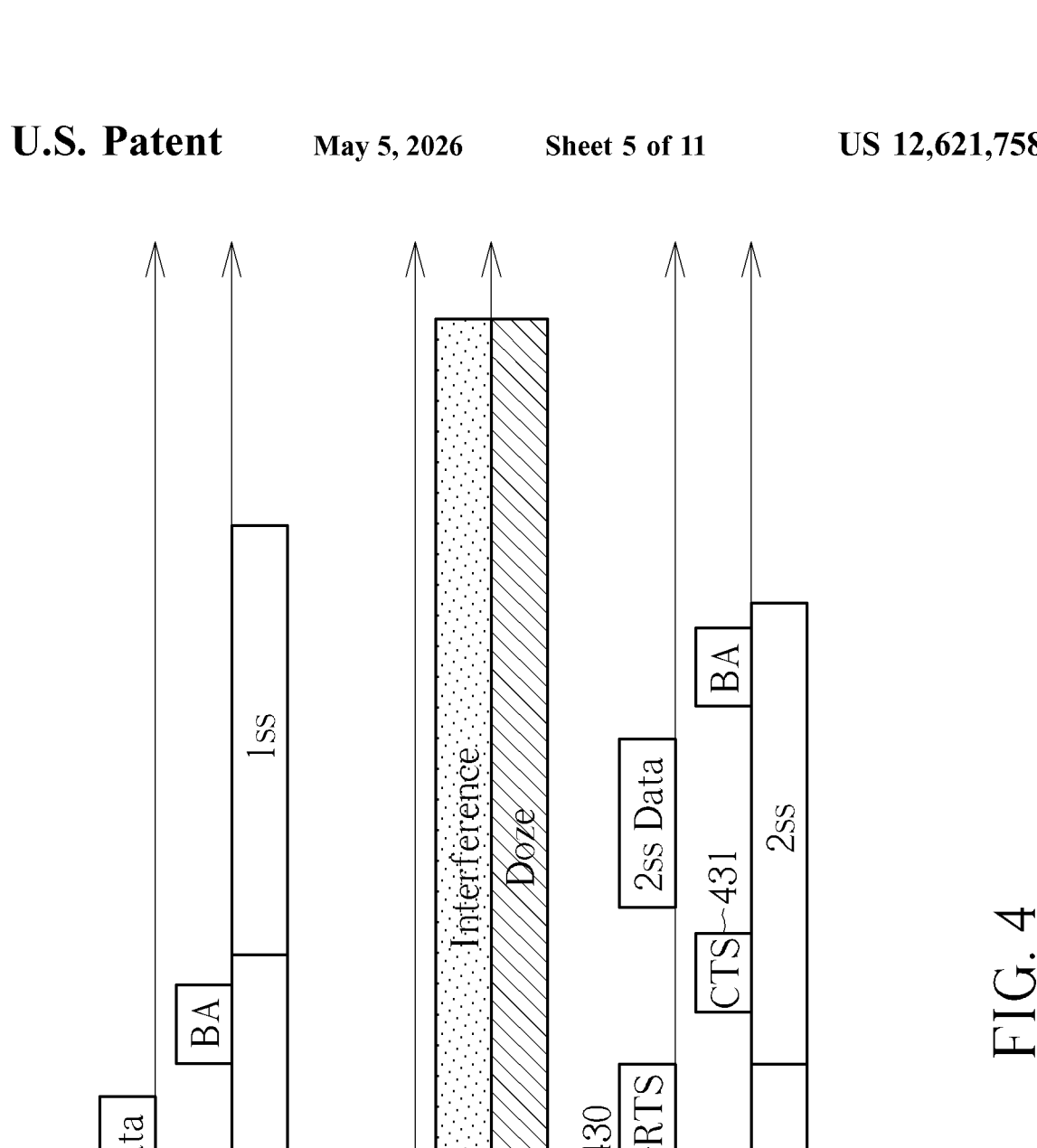
FIG. 4 is a diagram illustrating an exemplary signaling process to activate one or more links of the multi-link connection of another embodiment.

FIG. 4 is a diagram illustrating an exemplary signaling process to activate one or more links of the multi-link connection of another embodiment. The AP MLD 110 and the non-AP MLD 120 has established a multi-link connection that includes configuration for a first link 131 (i.e., primary link), the second link 132 and the third link 133 (i.e., non-primary links). In this scenario, the radio frequency band used by the second link 132 may have interference from other signals (e.g., Bluetooth). For example, the other signals may be transmitted or received by the same device having the non-AP MLD 120. Thus, this may cause the second link 132 not to operate properly.

Initially, the first AP 111 may transmit to the first STA via the first link 131 an initial control frame 410 (e.g., Buffer Status Report Poll (BSRP) frame) with a bitmap for indicating the links 131, 132 and 133 is expected to be activated. When the first STA 121 receives the initial control frame 410, the first STA 121 may respond via the first link 131 with a response frame 411 (e.g., Buffer Status Report (BSR) frame) which carries information for indicating which links to be accepted or rejected, for example, to activate links 131 and 133 but reject the second link 132 due to interference. After the first STA 121 transmits the response frame 411, the third STA 123 wakes up from doze mode and enables one receiving chain as shown in FIG. 4. When the first AP 111 receives the response frame 411, the third AP 113 may transmit to the third STA 123 via the third link 133 a control frame 430 (e.g., Multi-User Request to Send (MU-RTS) frame) for contending channel with the third STA 123. When the third STA 123 receives the control frame 430, the third STA 123 may respond via the third link 133 with a response frame 431 (e.g., Clear to Send (CTS) frame) indicating the third STA 123 is ready to receive. In contrast, the second STA 122 would remain in the doze mode.

After the first STA 121 receives the initial control frame 410, the first link 131 may upgrade from one spatial stream to two spatial streams, that is, the first STA 121 associated with the first link 131 enables additional receiving chain. Then, the first AP 111 may transmit 2ss data frames and the first STA 121 may respond with BA frames. Furthermore, after the third STA 123 receives the control frame 430 or the third STA 123 responds with the response frame 431, the third link 133 may upgrade from 1ss to 2ss. Then, the third AP 113 may transmit 2ss data frames and the third STA 123 may respond with BA frames. Alternatively, the third STA 123 can directly enable N (such as 2) receiving chains when waking up.

In some embodiments, after the first STA responds to the initial control frame 410, the non-AP MLD 120 may activate the third link 133 and transmit a QoS null frame or a PS-Poll frame to the AP MLD 110 via the third link 133 when a backoff timer for the third link 133 in the non-AP MLD decreases to 0. In some embodiments, after the first STA responds to the initial control frame 410, the non-AP MLD 120 may activate the third link 133 after a predefined delay period.

In addition, the response frame 411 carries information for indicating which links may be accepted or rejected. If the response frame does not carry information indicating which links may be accepted or rejected, then all links are regarded as accepted and may be activated.

It should also be noted that the above embodiments are mere examples for illustration purpose. Those skilled in the art may easily implement initial control frames and response frames with simple modifications. Thus, the present invention is not limited thereto.

Figure 5:
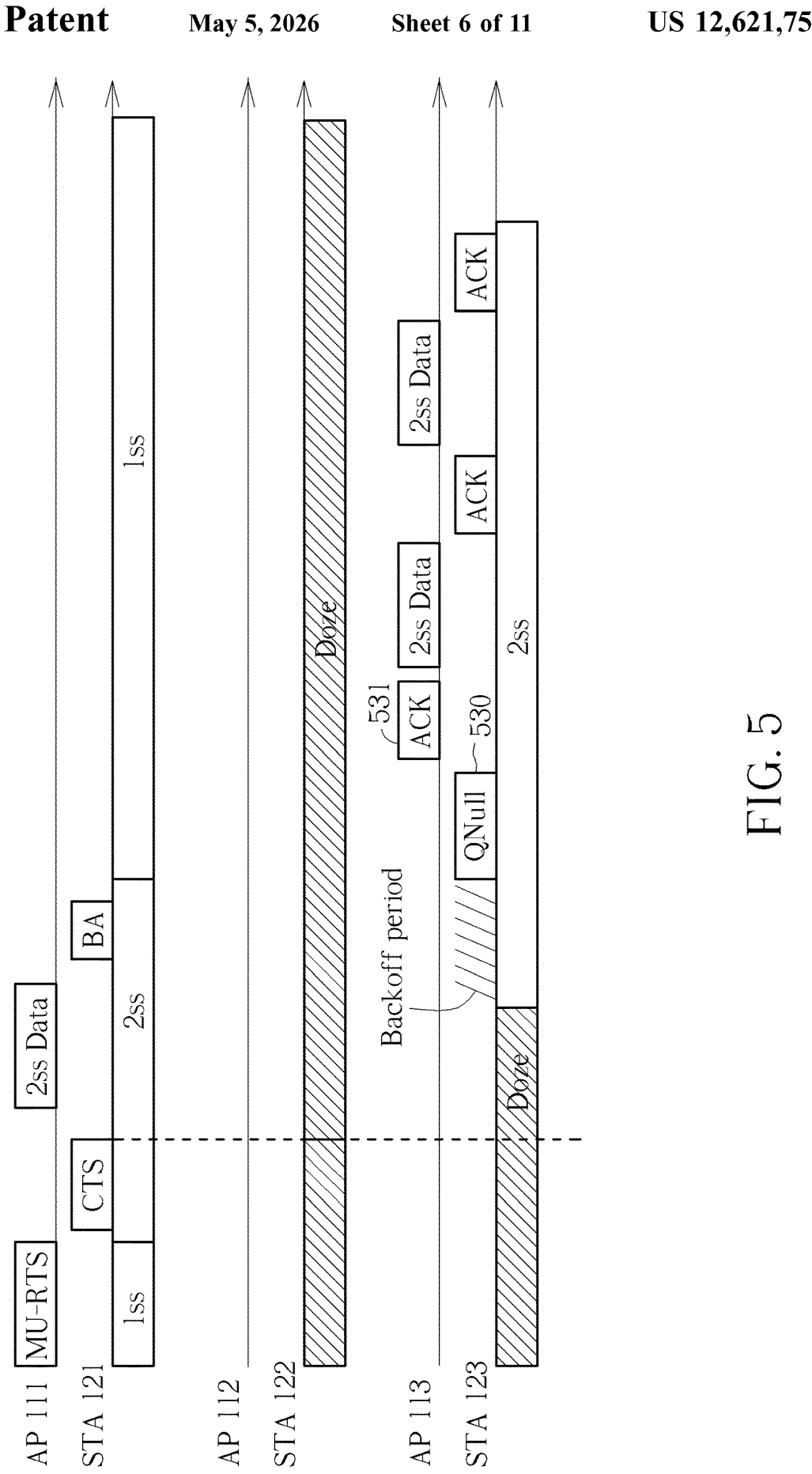
FIG. 5 is a diagram illustrating an exemplary signaling process to exchange frame on the links of the multi-link connection of an embodiment.

FIG. 5 is a diagram illustrating an exemplary signaling process to exchange frame on the links of the multi-link connection of an embodiment. In this embodiment, the second STA 122 remains in the doze mode. The initiation procedure has been described the paragraphs associated with FIGS. 3 and 4 and is not repeated herein. For example, after the first STA 121 receives the initial control frame via the primary link, the third STA 123 may wake up from doze mode immediately or after a preset time period, and the third STA 123 may start a backoff timer. When the backoff timer for the third link 131 expires, the third STA 123 may transmit a control frame 530 (e.g., Power-save poll (PS-Poll) frame, or quality of service (QoS) null frame (referred to "QNull" in FIG. 5) indicating the third STA 123 is ready to receive (for example, the third STA 123 has enabled 2 receiving chains). When the third AP 113 receives the control frame 530, the third AP 113 may respond with a response frame 531 (e.g., ACK frame) to indicate that the third AP 113 will transmit data via the third link. Then, the third AP 113 may transmit 2ss data frames to the third STA 123, and the third STA 123 may respond with ACK frames. In the embodiment, the third STA 123 need to be enabled 2ss before receiving the 2ss data frames. For example, the third STA 123 may enable 2ss when it wakes up, alternatively, the third STA 123 may enable 1ss when it wakes up and switch to 2ss after receiving the response frame 531.

Figure 6:
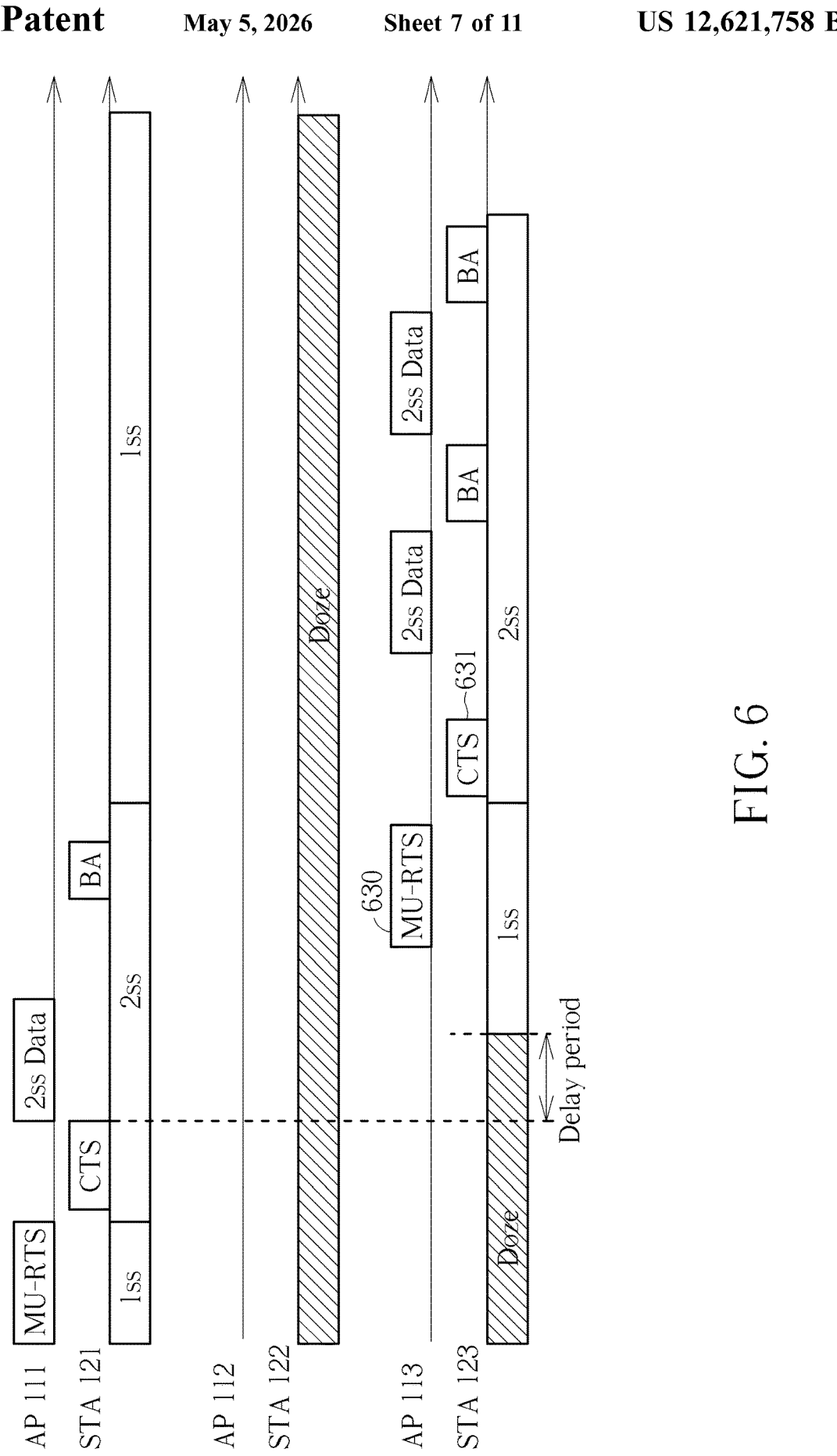
FIG. 6 is a diagram illustrating an exemplary signaling process to exchange frame on the links of the multi-link connection of another embodiment.

FIG. 6 is a diagram illustrating an exemplary signaling process to exchange frame on the links of the multi-link connection of another embodiment. In this embodiment, the second STA 122 remains in the doze mode. The initiation procedure has been described the paragraphs associated with FIGS. 3 and 4 and is not repeated herein. For example, after the first STA 121 responds with the response frame via the primary link, the third STA 123 wakes up from doze mode after a predefined delay period, and then the third AP 113 may transmit a control frame 630 (e.g., MU-RTS frame) to the third STA 123. When the third STA 123 receives the control frame 630, the third STA 123 may respond with a response frame 631 (e.g., CTS frame) to indicate that the third STA 123 is ready to receive data. Meanwhile, the third link 133 may upgrade to two spatial streams. Then, the third AP 113 may transmit 2ss data frames to the third STA 123, and the third STA 123 may respond with BA frames.

Figure 7:
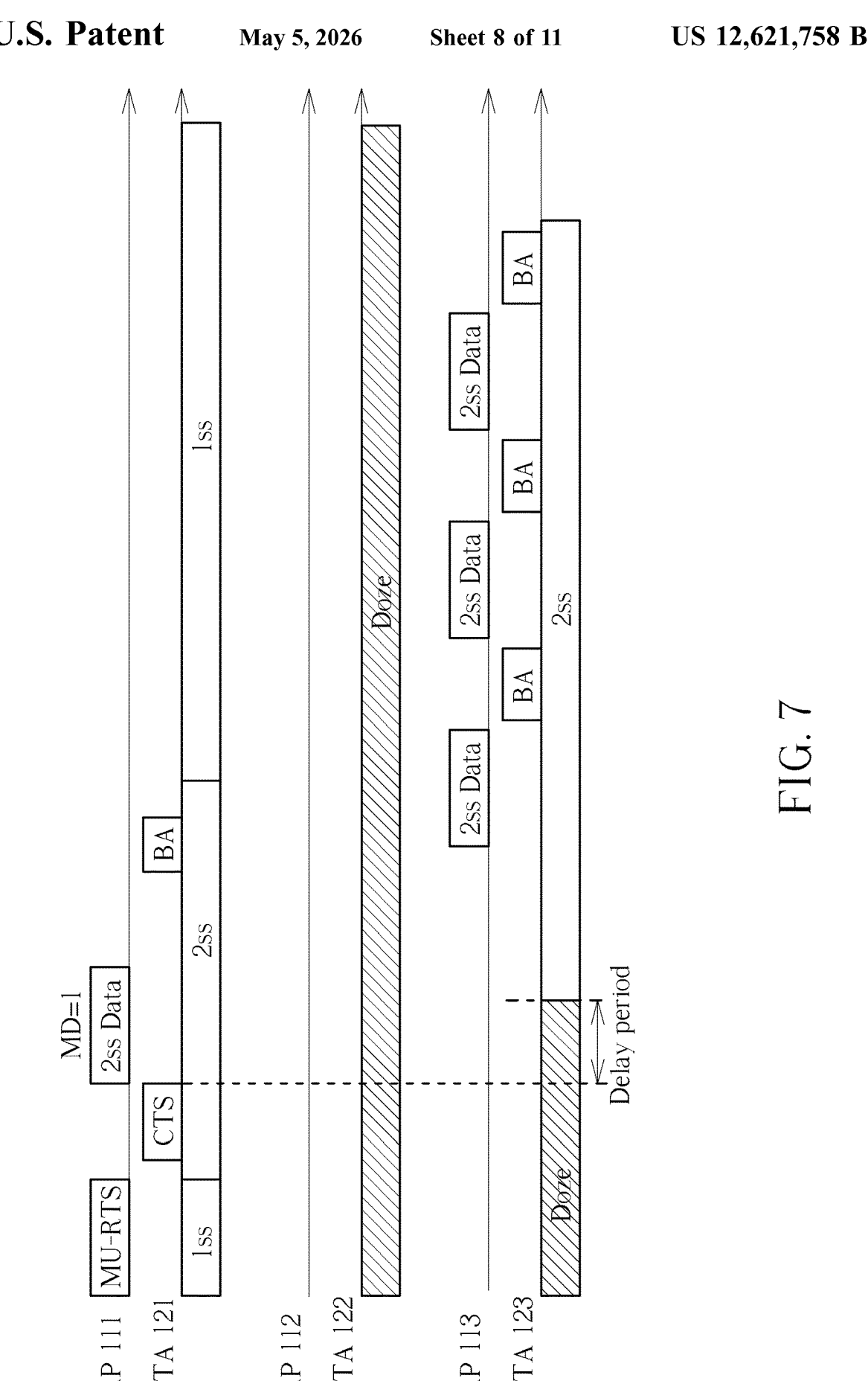
FIG. 7 is a diagram illustrating an exemplary signaling process to exchange frame on the links of the multi-link connection of another embodiment.

FIG. 7 is a diagram illustrating an exemplary signaling process to exchange frame on the links of the multi-link connection of another embodiment. In this embodiment, second STA 122 remains in the doze mode. The initiation procedure has been described the paragraphs associated with FIGS. 3 and 4 and is not repeated herein. For example, after the first STA 121 responds with the response frame via the primary link, the third STA 123 wakes up from doze mode after a predefined delay period and enables 2 receiving chains, that is, the third link may already be dedicated to the communication with two spatial streams. The third AP may directly transmit 2ss data frames to the third STA 113 without exchanging any control frame or response frame. Then, the third STA 113 may respond with BA frames.

Figure 8:
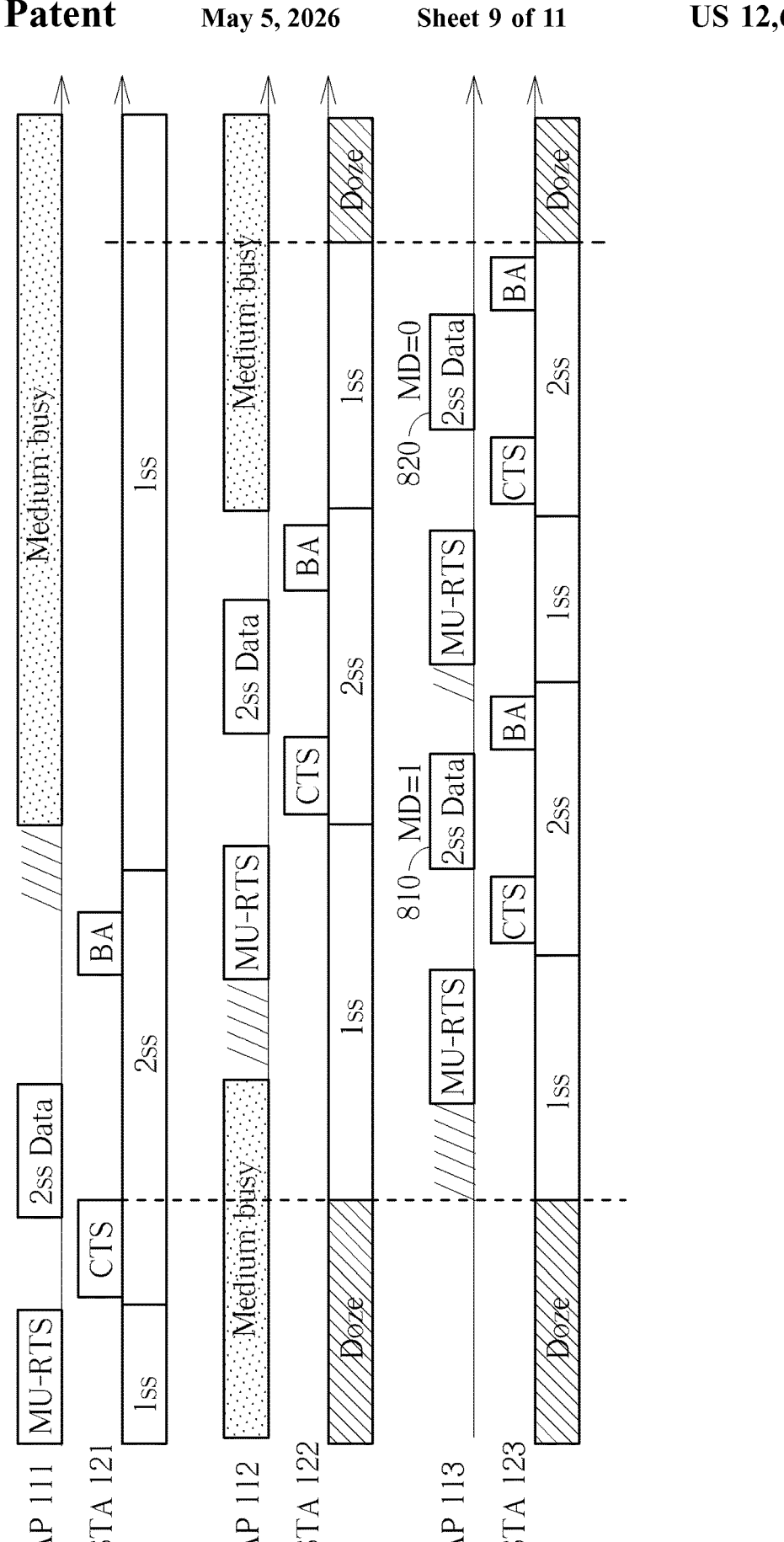
FIG. 8 is a diagram illustrating an exemplary signaling process to deactivate one or more links of the multi-link connection of an embodiment.

FIG. 8 is a diagram illustrating an exemplary signaling process to deactivate one or more links of the multi-link connection of an embodiment. This embodiment follows the procedure described in the embodiment associated with FIG. 5, 6 or 7. The initiation procedure has been described the paragraphs associated with FIGS. 3 and 4, and the frame exchange procedure has been described the paragraphs associated with FIGS. 5, 6 and 7; thus, they are not repeated herein. As shown in FIG. 8, the third AP 113 may transmit a 2ss data frame 810 with MD=1 to indicate more data to be transmitted. The third AP 113 may also transmit a 2ss data frame 820 with MD=0 to indicate no more data to be transmitted. When the third STA 123 receives the 2ss data frame 820 with MD=0, it may respond with a BA frame and enter the doze mode (link 131 would be deactivated). In this embodiment, a More Data (MD) bit is carried in the data frame, to indicate whether there is more data to be transmitted, and the non-AP MLD can determine whether to disable the corresponding link according to the MD bit. Further, the second STA 122 may also enter the doze mode once data frame with MD=0 received via other link (such as, the third link 133) by other STA (such as, the third STA 123) for power saving. In contrast, the first STA 121 would not enter the doze mode but would only switch back to one spatial stream even though "medium busy" also occurs on that radio channel. This is to maintain the first link 131, the primary link, active for the duration of multi-link connection. It should be noted that "medium busy" refers to other devices using the radio channel such that the AP MLD 110 and non-AP MLD 120 cannot communicate via that channel.

Figure 9:
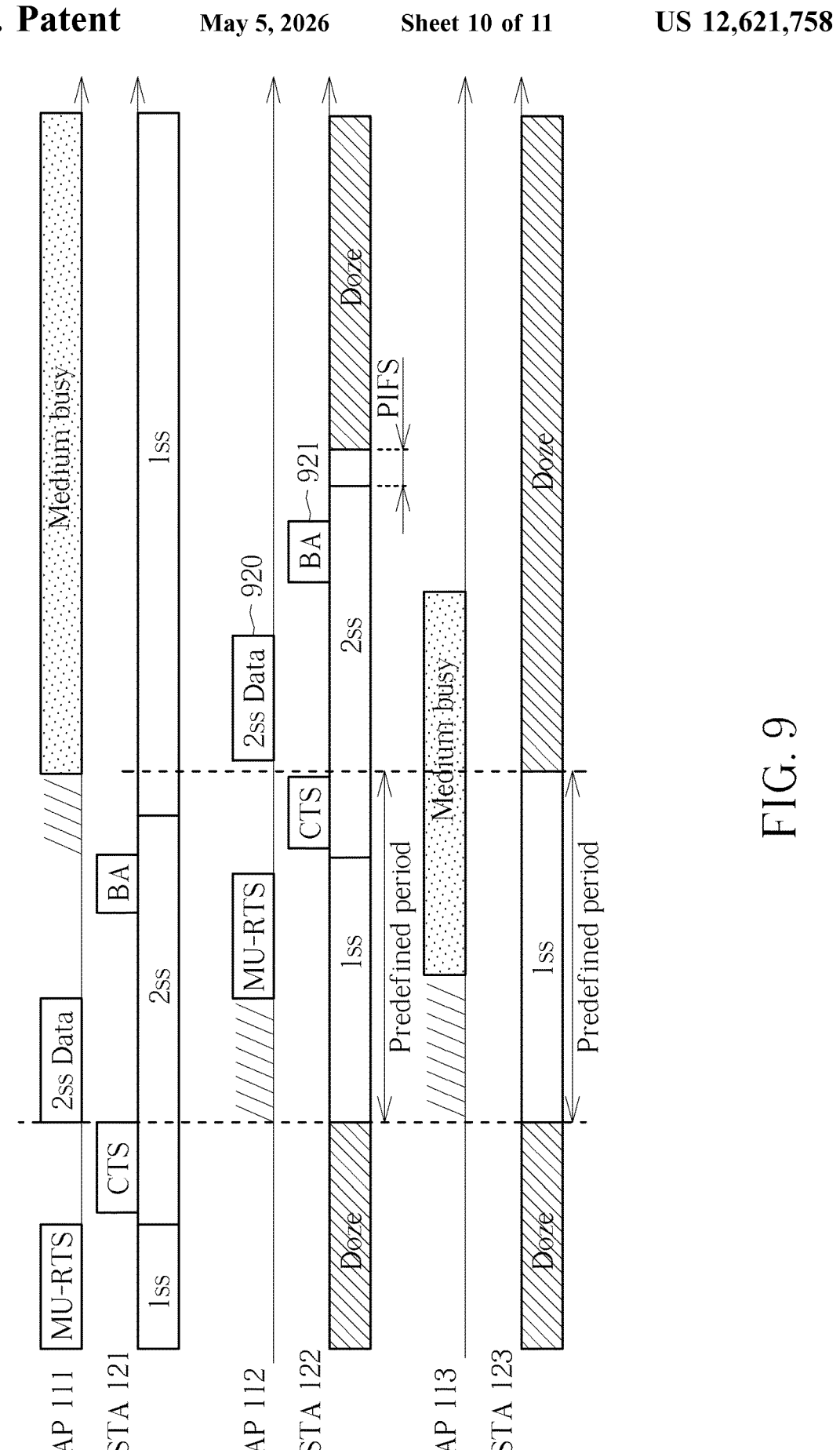
FIG. 9 is a diagram illustrating an exemplary signaling process to deactivate one or more links of the multi-link connection of another embodiment.

FIG. 9 is a diagram illustrating an exemplary signaling process to deactivate one or more links of the multi-link connection of another embodiment. This embodiment follows the procedure described in the embodiment associated with FIG. 5, 6 or 7. The initiation procedure has been described the paragraphs associated with FIGS. 3 and 4, and the frame exchange procedure has been described the paragraphs associated with FIGS. 5, 6 and 7; thus, they are not repeated herein. Due to "medium busy" on the radio channel for the third link, the third STA 123 may not receive any frame for a predefined period. As a result, the STA 123 may enter the doze mode for power saving. On the other hand, the second STA 122 may receive a control frame (e.g., MU-RTS frame) during the same predefined period, so the second STA 122 may not enter the doze mode and may receive a 2ss data frame 920 and respond with a BA frame 921. A Point Coordination Function (PCF)-Interframe Space (PIFS) may follow the transmission of the BA frame 921. If no any frame is received by the second STA 122 during the PIFS following the transmission of the BA frame 921, the second STA 122 may enter the doze mode for power saving. In some embodiments, Short Interframe Space (SIFS) and/or DCF-Interframe Space (DIFS) may be implemented for frame transmission.

Figure 10:
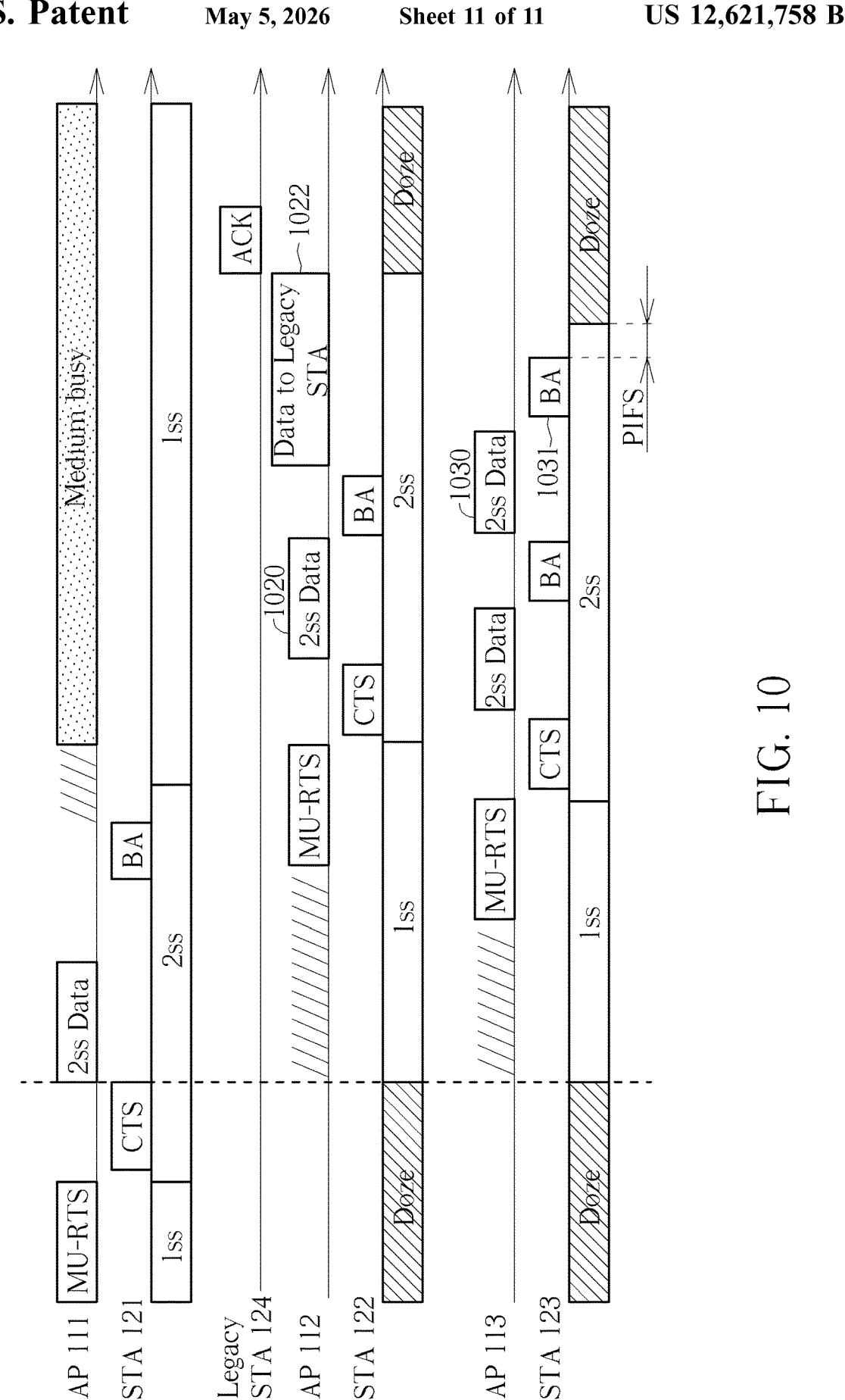
FIG. 10 is a diagram illustrating an exemplary signaling process to deactivate one or more links of the multi-link connection of another embodiment.

FIG. 10 is a diagram illustrating an exemplary signaling process to deactivate one or more links of the multi-link connection of another embodiment. This embodiment follows the procedure described in the embodiment associated with FIG. 5, 6 or 7. The initiation procedure has been described the paragraphs associated with FIGS. 3 and 4, and the frame exchange procedure has been described the paragraphs associated with FIGS. 5, 6 and 7; thus, they are not repeated herein. On the second link 132, the second AP 112 may transmit a 2ss data frame 1020 to the second STA 122, and then it may transmit another data frame 1022 to a legacy STA 124 of another device other than the non-AP MLD 120. Then, the legacy STA 124 may receive the data frame 1022 and respond with an ACK frame. The second STA 122 listening on the second link 132 may know that the second AP 112 starts to transmit data to another device. It may be assumed that the second AP 112 has already finished transmitting the data for the second STA 122, and has started transmitting to the legacy STA 124, therefore, the second STA 122 may determine that no frame would be directed to itself for some time and enter the doze mode for power saving.

On the third link 133, after the third STA 123 receives a 2ss data frame 1030 and respond with a BA frame 1031, a PIFS may follow. If no frame is received by the third STA 123 during the PIFS, the third STA 123 may enter the doze mode for power saving. In contrast, the first STA 121 would not enter the doze mode but would only switch back to one spatial stream even though "medium busy" also occurs on that radio channel. This is to maintain the first link 131, the primary link, active for the duration of multi-link connection.

In some embodiments described above, End of Service Period (EOSP) bit in a 2ss data frames may be 0 or 1 accordingly to indicate whether more data frames need to be transmitted. More Data (MD) bit in a 2ss data frames may be 0 or 1 accordingly to indicate whether more data frames need to be transmitted.

In some embodiments described above, there may be backoff slots for the AP MLD 110 and non-AP MLD 120 during the contention window before a transmission opportunity (TXOP), i.e., the time duration for which a station can send frames after it has gained contention for the transmission medium.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single-chip processor or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, multiple microprocessors, one or more microprocessors in conjunction with a DSP core, or any other such configuration. In some implementations, particular processes, operations and methods may be performed by circuitry that is specific to a given function.

In further detail, software and hardware hybrid implementations of at some of the embodiments disclosed may be implemented on a programmable network resident device (which should be understood to include intermittently connected network-aware device) selectively activated or reconfigured by a computer program stored in memory. Such network devices may have multiple network interfaces that may be configured or designed to utilize different types of network communication protocols. A general architecture for some of these devices may be disclosed herein in order to illustrate one or more examples by which a given unit of functionality may be implemented. In some embodiments, at least some of the features or functionalities disclosed herein may be implemented on one or more general-purpose computers associated with one or more networks, such as an end-user computer system, a client computer, a network server or other server system, a mobile computing device (e.g., tablet computing device, mobile phone, smartphone, laptop, and the like), a consumer electronic device or any other suitable electronic device, or any combination thereof. In some embodiments, at least some of the features or functionalities of the various embodiments disclosed may be implemented in one or more virtualized computing environments (e.g., network computing clouds, virtual machines hosted on one or more physical computing machines, or the like).

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Although some of various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

Reference has been made in detail to implementations, examples of which are illustrated in the accompanying drawings. In the detailed description above, numerous specific details have been set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing wireless communication in multi-link operation (MLO) architecture, the method being applicable to an access point (AP) multi-link device (MLD) connected with a non-AP MLD through multiple links, the multiple links comprising at least a first link and a second link, the non-AP MLD being operated in Multi-Link Spatial Multiplexing Power Save (ML-SMPS) mode, and the method comprising:

transmitting an initial control frame to the non-AP MLD via the first link, to trigger at least one link of the multiple links to be activated at the non-AP MLD to support a reception with respective negotiated number of spatial streams, wherein the first link is a primary link;

receiving a response frame via the first link in response to the transmission of the initial control frame; and initiating frame exchange between the AP MLD and the non-AP MLD via a target link of the at least one link, wherein the target link is selected from the at least one link according to the response frame.

2. The method of claim 1, wherein transmitting an initial control frame comprises:

transmitting an initial control frame with a bitmap or a field for indicating the at least one link of the multiple links to be activated at the non-AP MLD.

3. The method of claim 1, wherein:

when the response frame carries information for indicating which link of the at least one link to be accepted or rejected, the target link comprises an accepted link; and when the response frame does not carry information for indicating whether to accept or reject any link in the at least one link, the target link comprises all of the at least one link or the pre-negotiated link during enabling the ML-SMPS mode.

4. The method of claim 1, wherein:

the initial control frame is a Buffer Status Report Poll (BSRP) frame and the response frame is a Buffer Status Report (BSR) frame; or the initial control frame is a Multi-User Request to Send (MU-RTS) frame and the response frame is a Clear to Send (CTS) frame.

5. The method of claim 1, wherein:

the target link comprises the first link; and the step of initiating frame exchange between the AP MLD and the non-AP MLD comprises transmitting at least one data frame to the non-AP MLD via the first link after receiving the response frame.

6. The method of claim 1, wherein:

the target link comprises the second link; and the step of initiating frame exchange between the AP MLD and the non-AP MLD comprises transmitting at least one data frame from the second AP to the non-AP MLD via the second link following a predefined delay period;

wherein the predefined delay period occurs after the response frame has been received, or after exchanging a MU-RTS frame and a CTS frame between the AP MLD and the non-AP MLD via the second link, or after exchanging a quality of service (QoS) null frame or Power-save poll (PS-Poll) frame and an acknowledge (ACK) frame between the non-AP MLD and the AP MLD via the second link.

7. The method of claim 1, wherein the step of initiating frame exchange between the AP MLD and the non-AP MLD comprises:

transmitting a data frame to the non-AP MLD that carries a More Data (MD) bit to indicate whether there is more data to be transmitted; and when there is no more data to be transmitted, the MD bit carried in the data frame indicating to the non-AP MLD to deactivate the at least one link.

8. A method for performing wireless communication in multi-link operation (MLO) architecture, the method being applicable to a non-access point (AP) multi-link device (MLD) connected with an AP MLD through multiple links, the multiple links comprising at least a first link and a second link, the non-AP MLD being operated in Multi-link Spatial Multiplexing Power Save (ML-SMPS) mode, the method comprising:

receiving an initial control frame from the AP MLD via the first link, the initial control frame being used to trigger at least one link of the multiple links to be activated at the non-AP MLD to support a reception with respective negotiated number of spatial streams, wherein the first link is a primary link;

transmitting a response frame via the first link in response to the reception of the initial control frame;

activating a target link of the at least one link by enabling receiving chains for the target link to support reception with respective negotiated number of spatial streams; and initiating frame exchange between the non-AP MLD and the AP MLD via the target link in the at least one link, wherein the target link is selected from the at least one link according to the response frame.

9. The method of claim 8, wherein receiving an initial control frame comprises:

receiving an initial control frame with a bitmap or field for indicating the at least one link of the multiple links to be activated at the non-AP MLD.

10. The method of claim 8, wherein:

when the response frame carries information for indicating the at least one link being accepted and/or rejected, the target link comprises an accepted link; and when the response frame does not carry information for indicating whether to accept or reject the at least one link, the target link comprises all of the at least one link or the pre-negotiated link during enabling the ML-SMPS mode.

11. The method of claim 8, wherein the initial control frame is a Buffer Status Report Poll (BSRP) frame and the response frame is a Buffer Status Report (BSR) frame; or the initial control frame is a Multi-User Request to Send (MU-RTS) frame and the response frame is a Clear to Send (CTS) frame.

12. The method of claim 8, the step of initiating frame exchange between the non-AP MLD and the AP MLD comprises:

receiving at least one data frame from the non-AP MLD that carries one More Data (MD) bit to indicate whether there is more data after a current data frame; and when the one MD bit carried in the at least one data frame indicates there is no more data, deactivating the target link.

13. The method of claim 8, wherein:

the target link comprises a first link; and the step of activating a target link of the at least one link by enabling receiving chains for the target link to support reception with respective negotiated number of spatial streams comprises activating the first link after receiving the initial control frame or transmitting the response frame by enabling other receiving chains for the first link to support the reception with negotiated number of spatial streams via the first link.

14. The method of claim 8, wherein:

the target link comprises a second link; and the step of activating a target link of the at least one link by enabling receiving chains for the target link to support reception with respective negotiated number of spatial streams comprises activating the second link after transmitting the response frame by enabling receiving chains for the second link to support the reception with negotiated number of spatial streams via the second link.

15. The method of claim 14, wherein the step of activating the second link after transmitting the response frame comprises:

activating the second link immediately after transmitting the response frame; or activating the second link immediately after receiving the initial control frame transmitted from the AP MLD;

activating the second link after a predefined delay period after transmitting the response frame; or activating the second link and transmitting a QoS null frame or a PS-Poll frame to the AP MLD via the second link when a backoff timer for the second link at the non-AP MLD decreases to 0.

16. The method of claim 8 further comprising deactivating the target link, wherein deactivating the target link comprises:

if the non-AP MLD has not received any frame for a predefined period via certain link in the target link, deactivating the certain link.

17. An access point (AP) multi-link device (MLD) comprising:

a first AP and a second AP configured to establish multi-link connection between the AP MLD and a non-AP MLD, the connected multiple links comprising at least a first link between a first station (STA) of the non-AP MLD and a first AP of the AP MLD and a second link between the second STA of the non-AP MLD and a second AP of the AP MLD;

a processor coupled to the first AP and the second AP, configured to:

transmit an initial control frame to the non-AP MLD via the first link, to trigger at least one link of the multiple links to be activated at the non-AP MLD to support a reception with respective negotiated number of spatial streams, wherein the first link is a primary link;

receive a response frame via the first link in response to the transmission of the initial control frame; and initiate frame exchange between the AP MLD and the non-AP MLD via a target link of the at least one link; wherein the target link is selected from the at least one link according to the response frame.

18. The AP MLD of claim 17, wherein:

when the response frame carries information for indicating which link of the at least one link to be accepted or rejected, and the target link comprises an accepted link; and when the response frame does not carry information for indicating whether to accept or reject any link in the at least one link, and the target link comprises all of the at least one link or the pre-negotiated link during enabling the ML-SMPS mode.

19. A non access point (non-AP) multi-link device (MLD) comprising:

a first station (STA) and a second STA configured to establish multi-link connection between an AP MLD and the non-AP MLD, the connected multiple links comprising at least a first link between a first station (STA) of the non-AP MLD and a first AP of the AP MLD, and a second link between a second STA of the non-AP MLD and the second AP of the AP MLD;

a processor coupled to the first STA and the second STA, configured to:

receive an initial control frame from the AP MLD via the first link, the initial control frame being used to trigger at least one link of the multiple links to be activated at the non-AP MLD to support a reception with respective negotiated number of spatial streams, wherein the first link is a primary link;

transmit a response frame via the first link in response to the reception of the initial control frame;

activate a target link of the at least one link by enabling receiving chains for the target link to support reception with respective negotiated number of spatial streams, wherein the target link is selected from the at least one link according to the response frame; and initiate frame exchange between the non-AP MLD and the AP MLD via the target link in the at least one link.

20. The non-AP MLD of claim 19, wherein:

when the response frame carries information for indicating the at least one link being accepted and/or rejected, and the target link comprises an accepted link; and when the response frame does not carry information for indicating whether to accept or reject the at least one link, and the target link comprises all of the at least one link or the pre-negotiated link during enabling the ML-SMPS mode.

* * * * *